(12) United States Patent
Walker et al.

(10) Patent No.: US 11,032,969 B2
(45) Date of Patent: Jun. 15, 2021

(54) CROP DIVIDER FOR A CORN HEADER

(71) Applicant: CNH Industrial America LLC, New Holland, PA (US)

(72) Inventors: Eric L. Walker, Narvon, PA (US); Kyle Lauff, Wenonah, NJ (US); Brian P. Crow, Rock Island, IL (US); John P. Roeder, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 81 days.

(21) Appl. No.: 16/381,517

(22) Filed: Apr. 11, 2019

(65) Prior Publication Data

US 2020/0323132 A1 Oct. 15, 2020

(51) Int. Cl.
*A01D 41/06* (2006.01)
*A01D 45/02* (2006.01)

(52) U.S. Cl.
CPC .......... *A01D 41/06* (2013.01); *A01D 45/021* (2013.01)

(58) Field of Classification Search
CPC ...... A01D 41/06; A01D 45/021; A01D 63/04; A01D 65/00; A01D 63/00; A01D 45/02
See application file for complete search history.

(56) References Cited

U.S. PATENT DOCUMENTS

| | | | |
|---|---|---|---|
| 2,252,377 A * | 8/1941 | Hyman | A01D 45/021 56/119 |
| 4,125,988 A * | 11/1978 | Schlueter | A01D 46/12 56/30 |
| 4,300,335 A | 11/1981 | Anderson | |
| 4,346,548 A * | 8/1982 | Atkinson | A01D 45/021 56/119 |
| 4,493,181 A | 1/1985 | Glendenning et al. | |
| 5,438,819 A * | 8/1995 | Dallman | A01D 34/73 56/17.5 |
| 5,444,968 A * | 8/1995 | Barton | A01D 45/021 56/119 |
| 5,761,893 A | 6/1998 | Lofquist et al. | |
| 5,775,076 A | 7/1998 | Mossman | |
| 5,787,697 A | 8/1998 | Post | |
| 5,910,092 A * | 6/1999 | Bennett | A01D 45/021 56/119 |
| 6,513,313 B1 * | 2/2003 | Bennett | A01D 45/021 56/119 |
| 6,625,969 B2 * | 9/2003 | Glazik | A01D 63/04 56/119 |
| 6,901,730 B1 | 6/2005 | Buresch et al. | |
| 8,387,352 B2 | 3/2013 | Silver et al. | |

(Continued)

*Primary Examiner* — Thomas B Will
*Assistant Examiner* — Madeline Ivy Runco
(74) *Attorney, Agent, or Firm* — Peter Zacharias; Patrick Sheldrake

(57) ABSTRACT

A crop dividing device for an agricultural header including a hood and a divider connected to the hood. The divider includes a base member pivotally connected to the hood. The base member includes a receiving section. The divider also includes an ear dam member receivable in the receiving section. The ear dam member is positionable in between a first position for increasing an overall slope of the divider and a second position for decreasing the overall slope of the divider. The ear dam member is connected to the receiving section in the first position, and the ear dam member is connected to one of the hood and base member in the second position.

20 Claims, 8 Drawing Sheets

(56) References Cited

U.S. PATENT DOCUMENTS

| | | | |
|---|---|---|---|
| 8,640,434 B2* | 2/2014 | Lohrentz | A01D 45/021 |
| | | | 56/119 |
| 8,938,940 B2* | 1/2015 | Mossman | A01D 63/04 |
| | | | 56/314 |
| 9,253,944 B2 | 2/2016 | Hulstein et al. | |
| 9,642,307 B2* | 5/2017 | Long | A01D 63/04 |
| 9,675,006 B2* | 6/2017 | Walker | A01D 45/021 |
| 9,992,935 B2* | 6/2018 | Van Overschelde | A01D 63/04 |
| 10,159,188 B2* | 12/2018 | Gessel | A01D 45/021 |
| 2010/0205922 A1* | 8/2010 | Pierson | A01D 43/14 |
| | | | 56/14.3 |
| 2018/0054971 A1 | 3/2018 | Gessel et al. | |
| 2019/0045710 A1* | 2/2019 | Benes | A01D 57/22 |

\* cited by examiner

CROP DIVIDER FOR A CORN HEADER

FIELD OF THE INVENTION

The present invention pertains to a corn header for an agricultural vehicle and, more specifically, to a crop divider on a corn header.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A typical header generally includes a frame, a pair of end dividers at the lateral ends of the frame, a cutter to remove crop material from the field, and a conveyor to transport the cut crop material to the feeder housing for further downstream processing in the combine. Generally, these features of a typical header are specifically optimized to harvest a particular kind of crop material. For instance, to harvest rows of corn, the header may be in the form of a corn header which generally includes snouts, a conveyor, row units, and accompanying drive architecture to power the header. The snouts are conically shaped to pass in between the rows of corn, defining a designated passageway or gap in between the snouts for the rows of corn to travel therein. The conveyor is disposed aft of the row units and transports the crop material to the center of the header for entry into the feeder house. The conveyor may be in the form of a conveyor belt, an auger with a tubular shaft having left and right flighting, or a combination of both. The row units generally include gathering chains, stalk rolls, and respective gear boxes to drive the gathering chains and stalk rolls. As the agricultural vehicle traverses the field, the corn stalks are pulled inwardly by the gathering chains and downwardly by the stalk rolls. This motion causes the ears of corn to contact the base of the header and snap off their respective stalks. The gathering chains additionally help to move crop material inwardly towards the conveyor. The stripped corn stalks are further pinched and crushed by the stalk rolls, in order to accelerate the decomposition process of the stalks. The header may also include chopping units that have reciprocating blades located beneath the stalk rolls to chop the stalks, leaves, and other debris (also known as material other than grain "MOG").

In order to prevent grain loss, some corn headers may further include various corn saving attachments connected to each row divider. As can be appreciated, once the ears of corn are separated from the stalk, it is possible for loose crop material, such as down corn, separated ears of corn, free corn kernels, etc., to fall out of the forward end of the corn header before the loose crop material can be transported into the conveyor section of the corn header. One type of corn saving attachment is an ear loss inhibitor, such as an ear dam or ear cover, which prevents loose crop material from falling out of the corn header. For example, the ear dam can be in the form of a surface profile on the hood body. The ear dam may have a ramped section and a rear flat face that prevents crop material from sliding out of the header. Additionally, for example, ear covers, i.e., flaps, can be coupled to adjacent sides of the row divider and thereby extend inwardly into the gap between juxtaposed row dividers. These flaps are located just above the gathering chains and thereby create a barrier directly above the gathering chains within the gap between juxtaposed row dividers. In more detail, the deformable and/or hingedly attached flaps may deform or pivot to allow the corn stalks to enter through the gaps between the row dividers but subsequently prevent loose crop material from falling out of this gap. Such ear loss inhibitors are valuable for increasing crop yield; however, they are generally not adjustable or easily interchangeable in order to accommodate various kinds of crop material. Furthermore, corn saving attachments may be complex and cumbersome to maintain and store.

What is needed in the art is a cost-effective and adjustable crop saving attachment.

SUMMARY OF THE INVENTION

In one exemplary embodiment formed in accordance with the present invention, there is provided a crop dividing device for adjusting the crop saving ability of a corn header. The crop dividing device includes a hood and a divider, e.g. snout. The divider is a two-part divider which generally includes a lower, base member and an upper, removable ear dam member integrated within the base member. The ear dam member may be positionable in between two positions in which the ear dam member sits on top of the base member and increases the overall slope of the divider and the ear dam member is stored within the hood or base member so that the ear dam member does not increase the overall slope of the divider.

In another exemplary embodiment formed in accordance with the present invention, there is provided a crop dividing device for an agricultural header with a frame. The crop dividing device includes a hood configured for connecting to the frame of the agricultural header and a divider connected to the hood. The divider includes a base member pivotally connected to the hood, which includes a receiving section, and an ear dam member receivable in the receiving section. The ear dam member is positionable in between a first position for increasing an overall slope of the divider and a second position for decreasing the overall slope of the divider. The ear dam member is connected to the receiving section in the first position, and the ear dam member is connected to one of the hood and base member in the second position.

In another exemplary embodiment formed in accordance with the present invention, there is provided a header connectable to an agricultural vehicle. The header includes a frame and at least one crop dividing device connected to the frame. The at least one crop dividing device includes a hood connected to the frame and a divider connected to the hood. The divider includes a base member pivotally connected to the hood, which includes a receiving section, and an ear dam member receivable in the receiving section. The ear dam member is positionable in between a first position for increasing an overall slope of the divider and a second position for decreasing the overall slope of the divider. The ear dam member is connected to the receiving section in the first position, and the ear dam member is connected to one of the hood and base member in the second position.

In another exemplary embodiment formed in accordance with the present invention, there is provided a method for selectively varying a crop saving capability of a header. The method includes the step of providing a crop dividing device for the header. The crop dividing device includes a hood configured for connecting to the header and a divider connected to the hood. The divider includes a base member pivotally connected to the hood, which includes a receiving section, and an ear dam member receivable in the receiving section. The method also includes the steps of positioning the ear dam member in a first position for increasing an overall slope of the divider by connecting the ear dam member to the receiving section, and positioning the ear dam member in a second position for decreasing the overall slope of the divider by connecting the ear dam member to one of the hood and base member.

One possible advantage of the exemplary embodiment of the corn header is that an operator may quickly and easily adjust the crop saving ability of each divider by removing the ear dam member in the divider and storing the ear dam member within the confines of the divider itself or the hood.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "forward", "rearward", "left" and "right", "upward", and "downward" when used in connection with the agricultural harvester, the header, and/or components of the harvester or header are usually determined with reference to the direction of forward operative travel of the agricultural harvester, yet they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
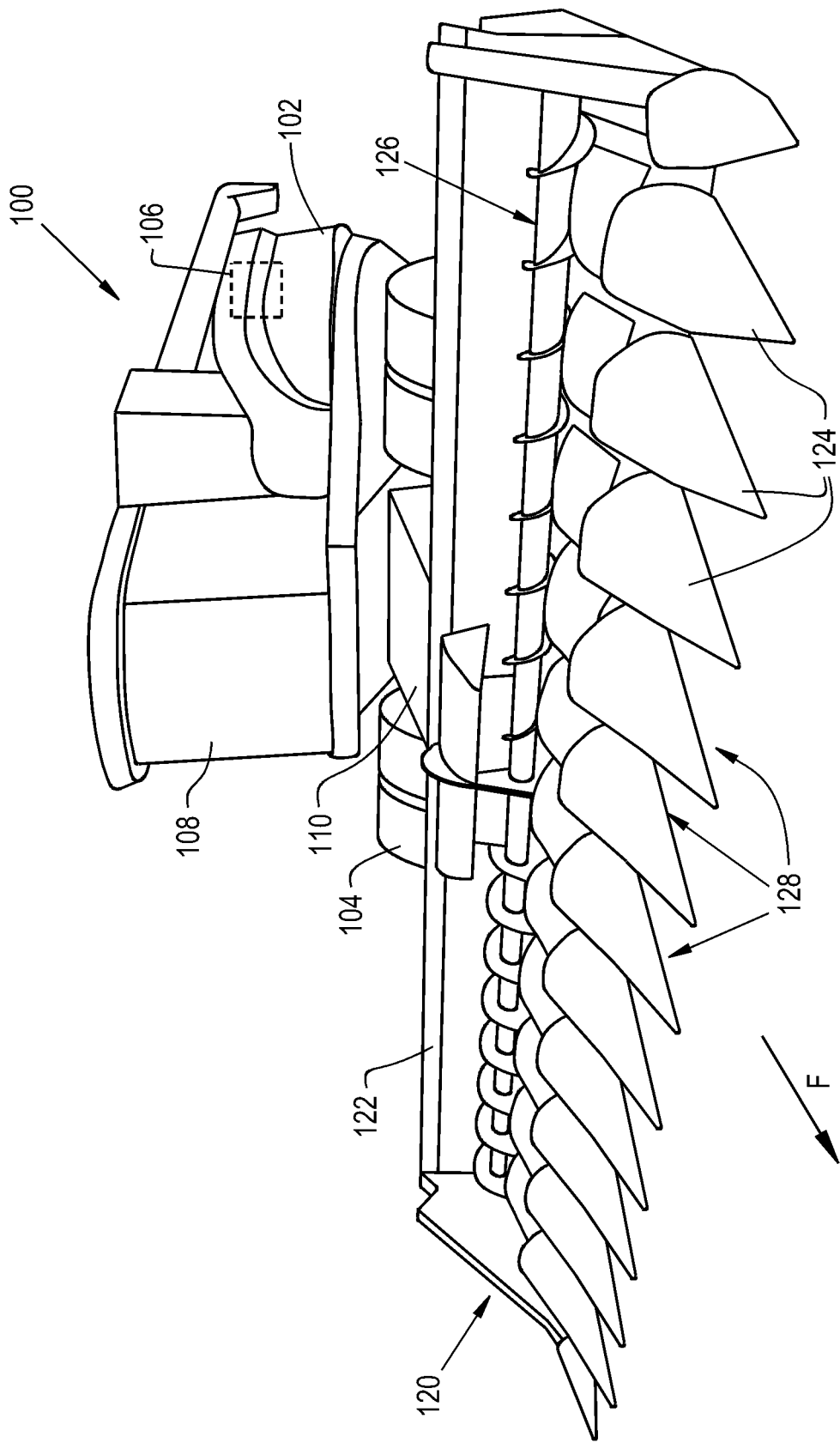
FIG. 1 illustrates a perspective view of an agricultural vehicle with a known corn header.

Referring now to the drawings, and more particularly to FIG. 1, there is shown an exemplary embodiment of a conventional agricultural vehicle 100, which generally includes a chassis 102, wheels 104 driven by a prime mover 106, an operator cab 108, a feeder housing 110 pivotally connected to the chassis 102, and a header 120 connected to the feeder housing 110. The agricultural vehicle 100 may be in the form of any desired agricultural vehicle, such as a combine harvester 100.

The header 120 may be in the form of any desired header, such as a corn header 120. The corn header 120 may include a header frame 122, multiple crop dividing devices 124, which define channels therebetween for receiving the rows of corn, an auger 126 to convey the crop material inwardly toward the feeder housing 110, and at least one row unit 128 connected to and supported by the frame 122. Each crop dividing device 124 may include a divider, e.g. snout, that is pivotally attached to a hood, which is disposed rearwardly of the divider and connected to the frame 122. Each row unit 128 may include deck plates, gathering chains, stalk rolls, and choppers (not shown).

As the combine harvester 100 traverses a field in a forward direction "F", the standing corn stalks enter the header 120 through the crop receiving slots between juxtaposed crop dividing devices 124. Through the motion of the gathering chains and stalk rolls, the stalks are pulled inwardly and downwardly; and thereby, the stalks are cut from the field and the ears of corn are stripped from the stalks as they forcibly hit the deck plates. The ears of corn are then gathered by the auger 126 and are transported to the center of the header 120 for entry into the feeder housing 110 and subsequent downstream processing through the combine harvester 100. The stalks and the remaining MOG are pulled down by the stalk rolls, and they may be chopped into smaller pieces by the chopper.

Referring now to the drawings, and more particularly to FIGS. 2-5, there is shown an agricultural header 200 in the form of a corn header 200, which is attachable to an agricultural vehicle 100, as discussed above. The corn header 200 may be substantially similar to the corn header 120, except that the corn header 200 includes crop dividing devices 210, which are each attached to a frame 202 of the header 200. Each crop dividing device includes a hood 212 and a multipart divider 214. Each divider 214 allows an operator to change the crop saving capability of the corn header 200 by way of selectively changing the overall slope of the divider 214 via repositioning and/or storing one or more parts of the multi-part divider 214. Although only one crop dividing device 210 is shown, it should be appreciated that the corn header 200 may include multiple crop dividing devices 210.

The crop dividing devices 210 are connected to and supported by the frame 202 of the corn header 200. Each crop dividing device generally includes the hood 212 and the divider 214 attached thereto. As used herein, the term crop dividing device generally refers to the assembly of the hood 212 and the divider 214.

Each hood 212 may include a back end connected to the frame 202 and a front end which movably mounts the divider 214. The hood 212 may be in the form of any desired hood. For instance, the hood 212 may comprise any desired material, such as plastic, and the hood 212 may have any desired shape and surface profile. Each hood 212 may include ear saving features and/or attachments, such as ear dams and/or ear flaps. Furthermore, each hood 212 may include an internal space or housing 212S. The hood 212 may have protrusions, tracks, and/or tabs which engage with corresponding features on the ear dam member 218 in order to store the ear dam member 218.

Each divider 214, e.g. corn snout, may be pivotally connected to and positioned in front of the hood 212. Each divider 214 may generally include at least two members such as a base member 216 and a repositionable ear dam member 218 that can be moved in between a first, work position (FIG. 2) and a second, stored position (FIG. 3) in which the ear dam member 218 is stowable in the base member 216 or the hood 212, for example within the internal housing 212S. Each divider 214 may comprise any desired material, such as plastic, and may have any desired shape and surface profile. For example, the dividers 214 may be plastic dividers 214, which may be roto-molded. It should be appreciated that the terms "work position" and "stored position" broadly refer to a first position and a second position of the ear dam member 218 and should not be construed as limiting.

Figure 3:
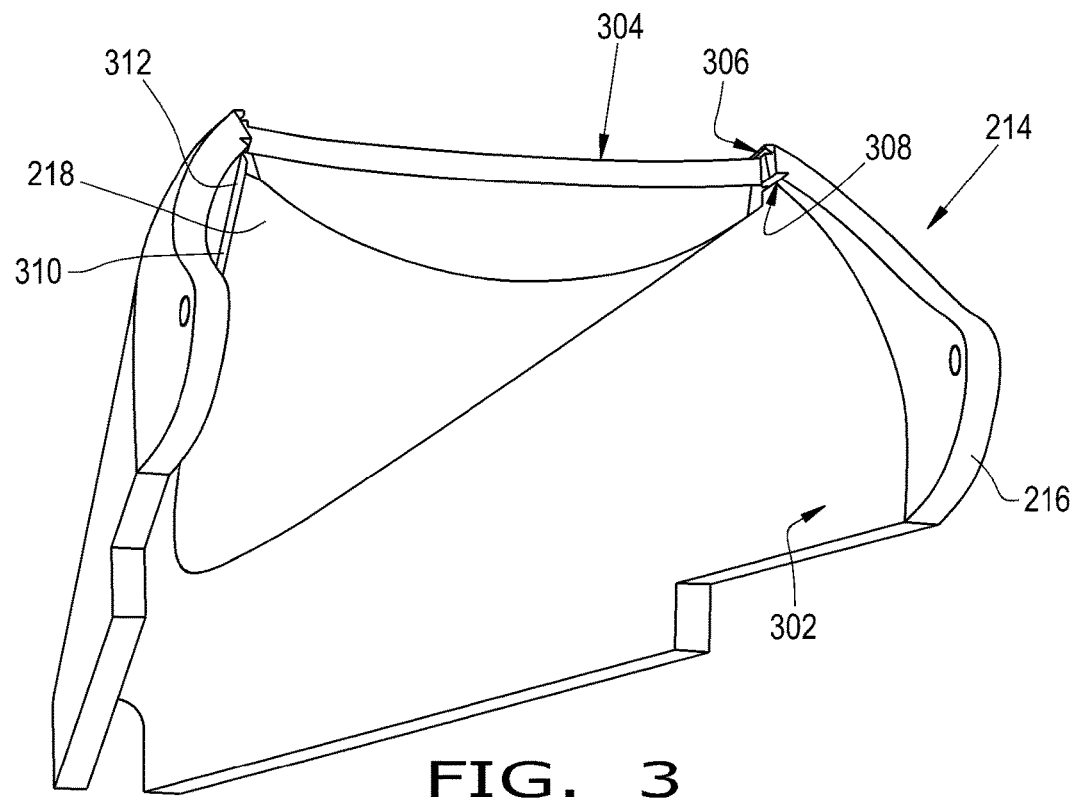
FIG. 3 illustrates a rear perspective view of the divider of FIG. 2 with the ear dam member in a stored position.

Each base member 216 is pivotally connected to the hood 212. Each base member 216 generally includes a first section 302, which defines a conical shell body 302, and a second section 304, which defines a receiving section 304 of the base member 216 (FIG. 3). Furthermore, each base member 216 may additionally include at least one track, groove, indentation, and/or channel. For example, each base member 216 may include an upper track 306, adjacent to the receiving section 304, and a lower track 308 inside the shell body 302. The tracks 306, 308 may be a continuous and/or segmented track. For instance, the upper track 306 may extend around the entire perimeter of the receiving section 304, and the lower track 308 may be composed of left and right segments.

Each base member 216 may be contoured so that the shell body 302 defines a first, upstream slope and the receiving section 304 defines a second, downstream slope that is less steep than the upstream slope. For example, the slope of the receiving section 304 may be approximately 10 degrees, plus or minus 5 degrees, less than the slope of the shell body 302. Additionally and/or alternatively, the change in slope between the shell body 302 and the receiving section 304 may allow for a removal of approximately 3-7 inches from the back height of the divider 214.

The receiving section 304 may be located adjacent to the back end of the divider 214. The receiving section 304 may extend from the back end toward the front end of the divider 214. Thereby, the receiving section 304 may span less than or more than half of the distance between the back end and front end of the divider 214. The receiving section 304 may be in the form of an indent, an opening, a carveout, and/or a recess. The receiving section 304 may have a shape which corresponds to the shape of the ear dam member 218.

Figure 2:
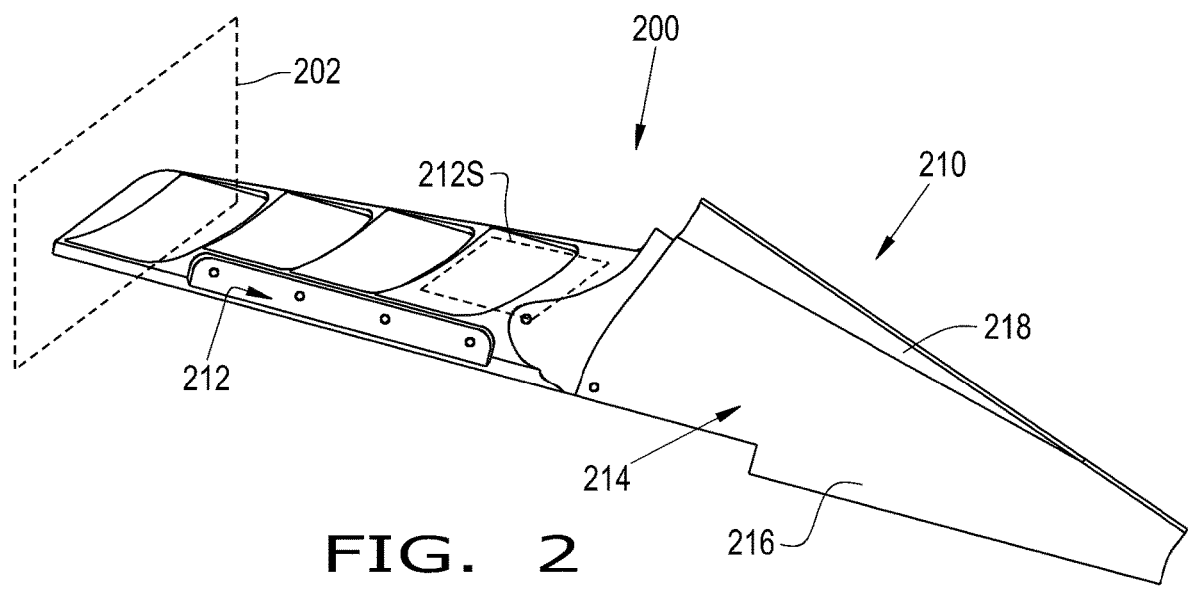
FIG. 2 illustrates a perspective view of an exemplary embodiment of a corn header with a crop divider, the crop divider comprising a base member and a removable, ear dam member, in accordance with an exemplary embodiment of the present invention.

The ear dam member 218 is receivable in the receiving section 304 of the base member 216. The ear dam member 218 may be fixedly or detachably connected to the receiving section 304. As shown, the ear dam member 218 is detachably connected to the receiving section 304. The ear dam member 218 may be positioned in the work position (FIG. 2) for increasing an overall slope of the divider 214 and the stored position (FIG. 3) so that the ear dam member 218 does not increase the overall slope of the divider 214, thereby decreasing the overall slope of the divider 214. In more detail, the ear dam member 218 may engage with receiving section 304 and contact the crop material in the work position, and the ear dam member 218 may be removed from the receiving section 304 and connected to the lower track 308, being stored within the shell body 302, so that only the base member 216, e.g. the surface of the receiving section 304, contacts the crop material. Thereby, as shown in FIGS. 2-4 of the present exemplary embodiment, the ear dam member 218 does not contact the crop material in the stored position.

Figure 4:
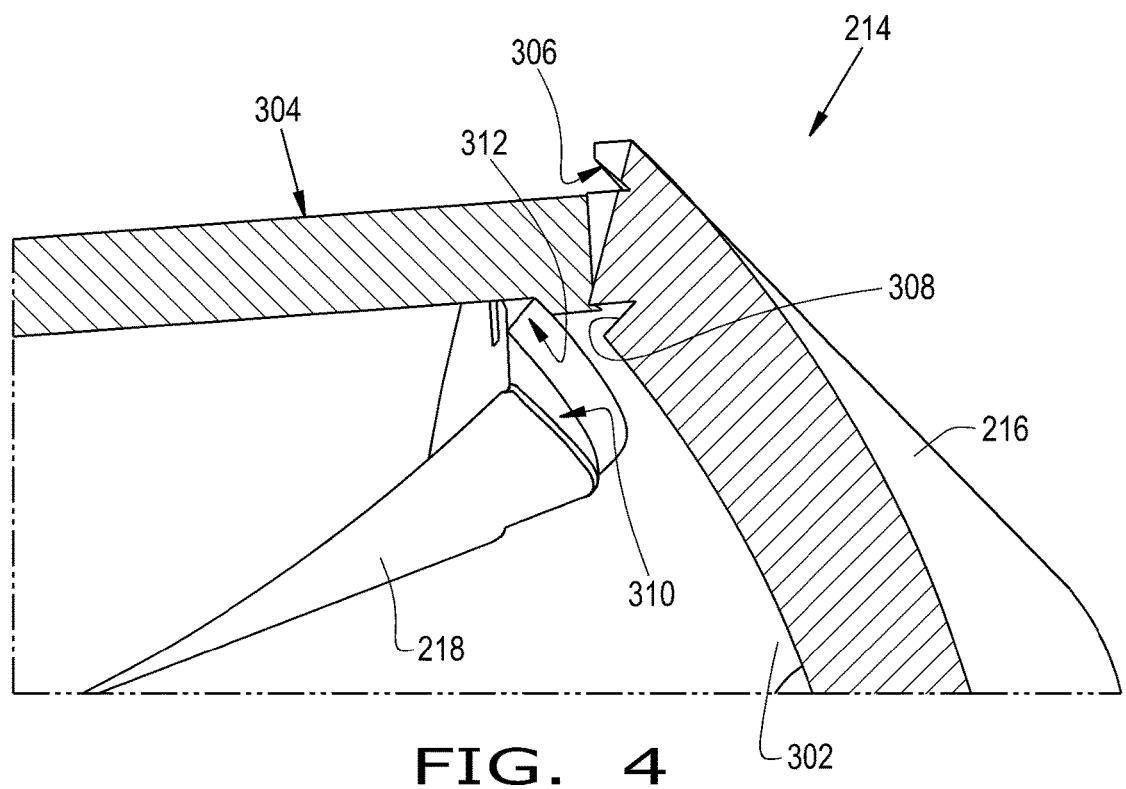
FIG. 4 illustrates another rear perspective view of the divider of FIGS. 2-3 with the ear dam member in the stored position.
Figure 5:
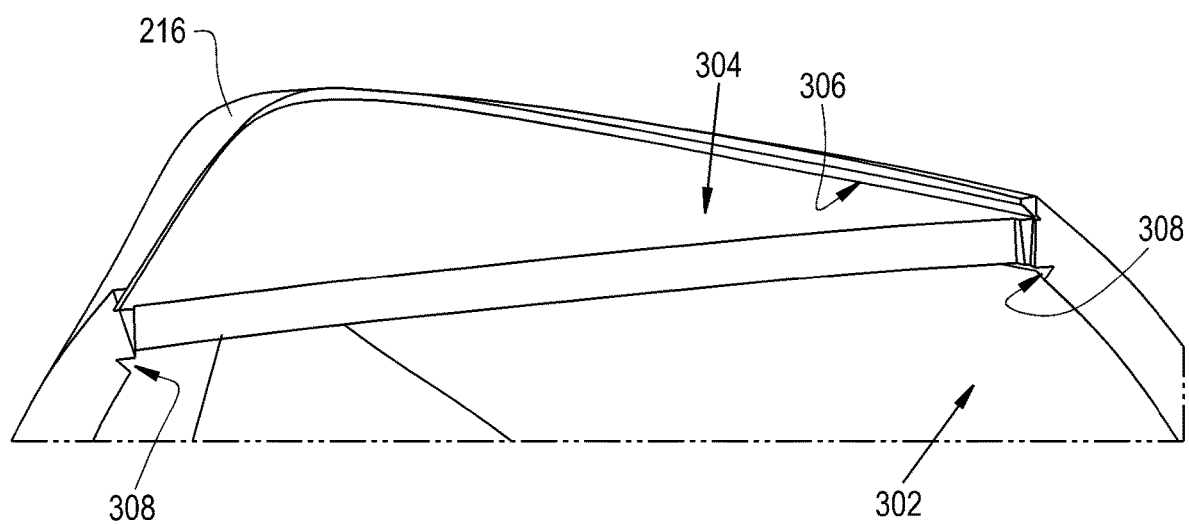
FIG. 5 illustrates a rear perspective view of the base member of the divider of FIGS. 2-4.

The ear dam member 218 may include a first, top side, a second, bottom side, a rim or vertical side wall 310, and at least one protrusion 312 extending outwardly therefrom (FIGS. 4-5). The top side and bottom side may define a top slope and bottom slope, respectively. The bottom slope may be less than the top slope, or vice versa. The top slope of the ear dam member 218 may substantially match the first slope of the shell body 302 of the base member 216, plus or minus 5 degrees. Hence, in the first position, the base member 216 and ear dam member 218 abut one another to form a uniform slope for continuous crop flow. The protrusion(s) 312 may engage with, e.g. slide in and out of, the upper track 306 in the work position or the lower track 308 in the stored position. Each protrusion 312 may be in the form of a tab or raised member, which may correspond in size and shape to each track 306, 308. The one or more protrusions 312 may be continuous or segmented, and may comprise any desired material, shape, and size. Also, it should be appreciated that the protrusion(s) 312 may be located on the ear dam member 218 at any desired location. For example, the protrusion 312 may be triangular and may be located at the bottom of the rim 310 of the ear dam member 218 (FIG. 4). In an alternative embodiment, the ear dam member 218 may include one or more tracks and the base member 216 may instead include one or more protrusions (not shown).

Thereby, the ear dam member 218 may be inserted into the base member 216 to increase the overall slope of the divider 214, for picking up crop in normal, standing conditions, or removed from the base member 216 to decrease the overall slope of the divider 214, for gathering down crop. Hence, in the work position, the ear dam member 218 extends above the surface of the base member 216. In the stored position, the ear dam member 218 may be conveniently stored within the structure of the crop dividing device 210, for example, within the divider 214 itself such that the ear dam member 218 does not extend above the base member 216. Thereby, an operator may easily and efficiently add or remove, and store, the ear dam member 218 to accommodate various crop conditions.

Figure 6:
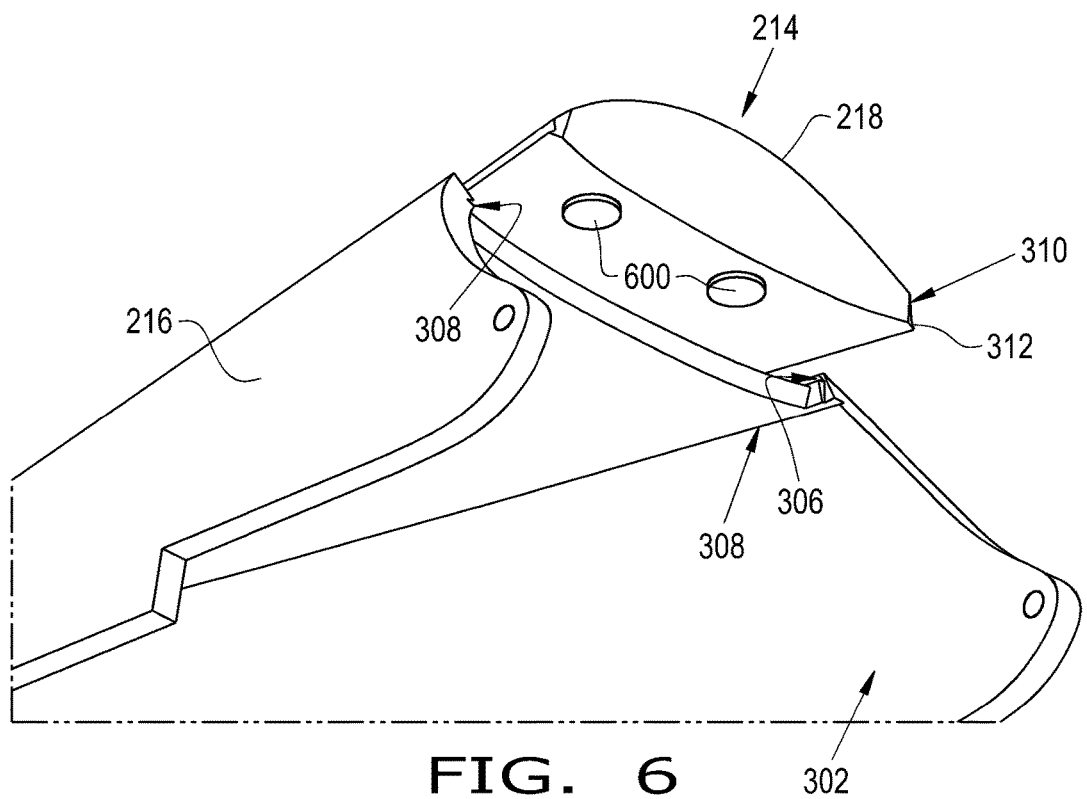
FIG. 6 illustrates a rear perspective view of another exemplary embodiment of a divider, the divider comprising a base member and a removable ear dam member that include respective locking features, in accordance with an exemplary embodiment of the present invention.
Figure 7:
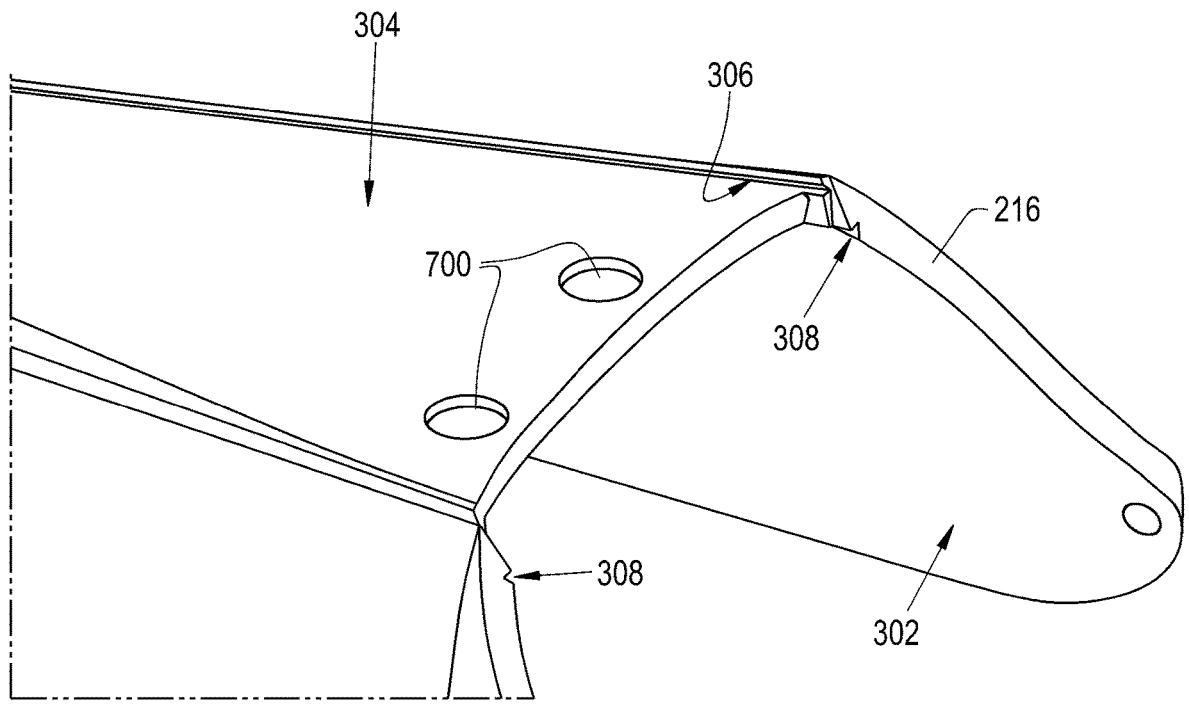
FIG. 7 illustrates a rear perspective view of the base member of the divider of FIG. 6.

Referring now to FIGS. 6-7, there is shown an alternative exemplary embodiment of the divider 214 in which the ear dam member 218 and the base member 216 each have at least one locking feature 600, 700. The ear dam member 218 may have locking features 600 in the form of protrusions 600, such as circular tabs or detents (FIG. 6). For instance, the bottom side of the ear dam 218 may have two downwardly-extending, circular tabs 600. The base member 216 may have locking features 700 in the form holes, grooves, and/or indents which correspond to the locking features 600 of the ear dam member 218 (FIG. 7). For instance, the receiving section 304 may include two circular indents 700 that correspond to the tabs 600 of the ear dam member 218. Thereby, the ear dam member 218 may slide and lock within the receiving section 304 of the base member 216 in the work position. The locking features 600, 700 of the divider 214 may be in the form of any desired locking features and comprise any desired material. It should be appreciated that the ear dam member 218 may instead include indents and the base member 216 may include protrusions which correspond to the indents of the ear dam member 218.

Figure 8:
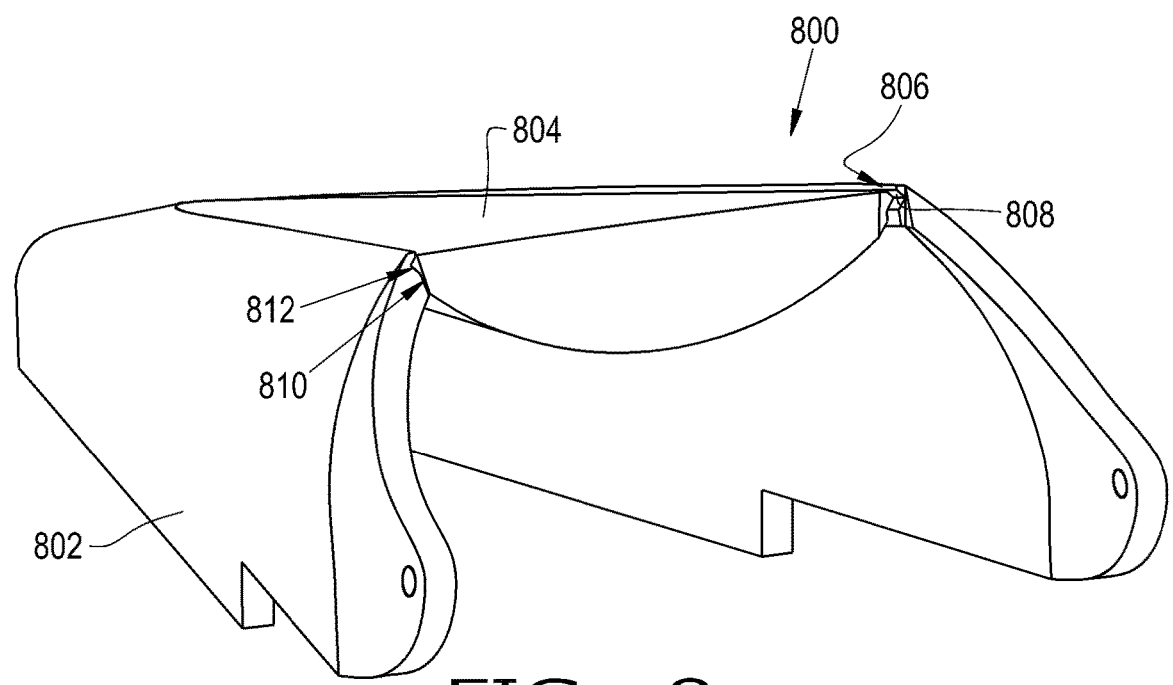
FIG. 8 illustrates a rear perspective view of an exemplary embodiment of a corn header with a crop divider, the crop divider comprising a base member and a removable ear dam member, in accordance with an exemplary embodiment of the present invention.
Figure 9:
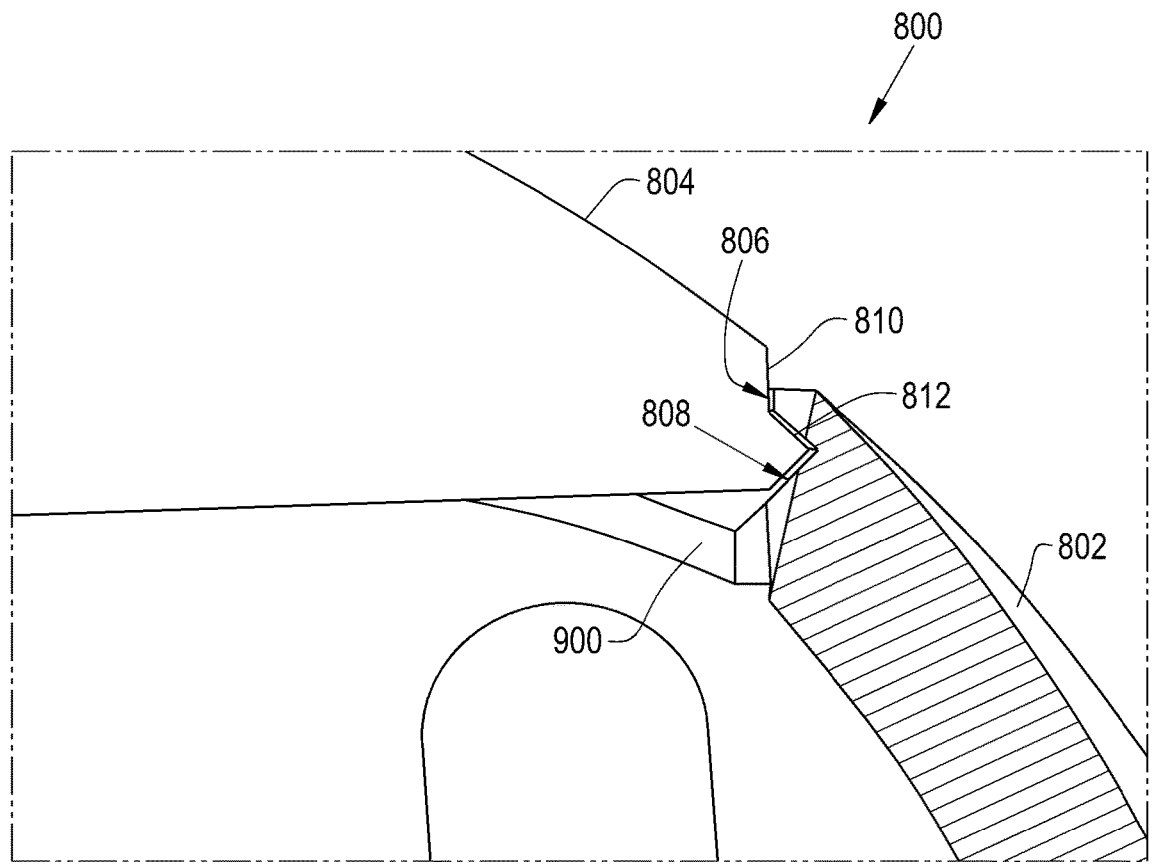
FIG. 9 illustrates a rear perspective view of the divider of FIG. 8.
Figure 10:
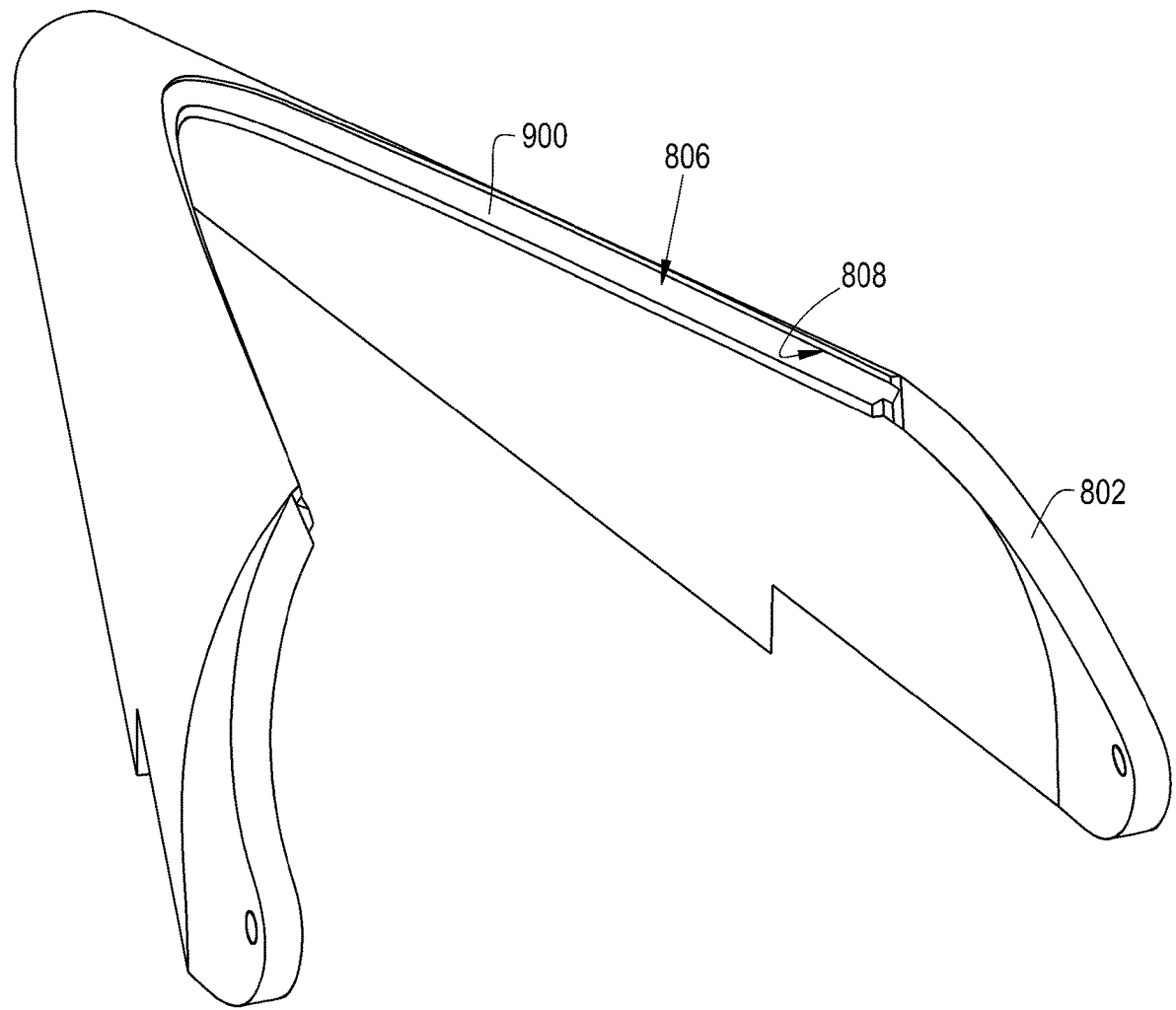
FIG. 10 illustrates a rear perspective view of the base member of the divider of FIGS. 8-9.

Referring now to FIGS. 8-10, there is shown another exemplary embodiment of a divider 800 that generally includes at least two members such as a base member 802 and a removable ear dam member 804. The divider 800 may be similar to the divider 214, as discussed above, except that the ear dam member 804 is positioned within the base member 802 so that the ear dam member 804 may contact the crop material in both of the stored position (FIG. 8) and work position (FIG. 9). It should be appreciated that the ear dam member 804 may be stored internally within the base member 802 or the internal space 212S of the hood 212.

The base member 802 may be similar to the base member 216 of the divider 214, as discussed above, except that the base member 802 includes a receiving section 806 in the form of an opening 806 with a single track 808 and a rail or lip 900 (FIGS. 9-10). The shape of the receiving section 806 may substantially match the shape of the ear dam member 804. The track 808 may be located within the opening 806. The track 808 may have any desired shape. The track 808 may be symmetrical such that the top and bottom portion of the track 808 are mirrored portions of one another. For example, the track 808 may have a cross-section in the form of an equilateral triangle. The rail 900, located underneath the track 808, may at least partially support the ear dam member 804. The rail 900 may at least partially extend outwardly from the receiving section 806. It should be appreciated that the receiving section 806 may not include a rail 900.

The ear dam member 804 may be similar to the ear dam member 218 of the divider 214, as discussed above, except that the ear dam member 804 mates with the base member 802 in both of the work and stored positions (FIGS. 8-9). The ear dam member 804 may include a first, top side, a second, bottom side, a rim or vertical side wall 810, and at least one protrusion 812 extending outwardly therefrom.

The top side and bottom side of the ear dam member 804 may define a top slope and bottom slope, respectively. The bottom slope may be less than the top slope, or vice versa. For instance, one side of the ear dam member 804 may be curved and have a slope that substantially matches the slope of the shell of the base member 802, and the other side may have a zero slope so that the other side is substantially flat (FIG. 8). Hence, in the first position, the curved side of the ear dam member 804 faces upwardly and extends above the base member 802, which then increases the overall slope of the divider 800. In the second position, the flat side of the ear dam member 804 faces upwardly and engages with the crop material; yet, the ear dam member 804 does not extend above the base member 802. With respect to the divider 800, the stored position of the ear dam member 804 may refer to a position of the ear dam member 804 in which the second surface contacts the crop material, and the first, curved and sloped surface is stored within the base member 802. In an alternative embodiment, each side of the ear dam member may each be curved and/or have a respective slope such that either side extends above the base member 802 in either position of the ear dam member 804.

The protrusion 812 of the ear dam member 804 may engage with, e.g. slide into, the track 808 of the base member 802 in either position. The protrusion 812 may correspond to the track 808 of the base member 802. For example, the protrusion 812 may have a cross-section in the form of an equilateral triangle that corresponds with the track 808. However, the protrusion 812 may be in the form of any desired shape which may or may not correspond with the shape of the track 808.

Figure 11:
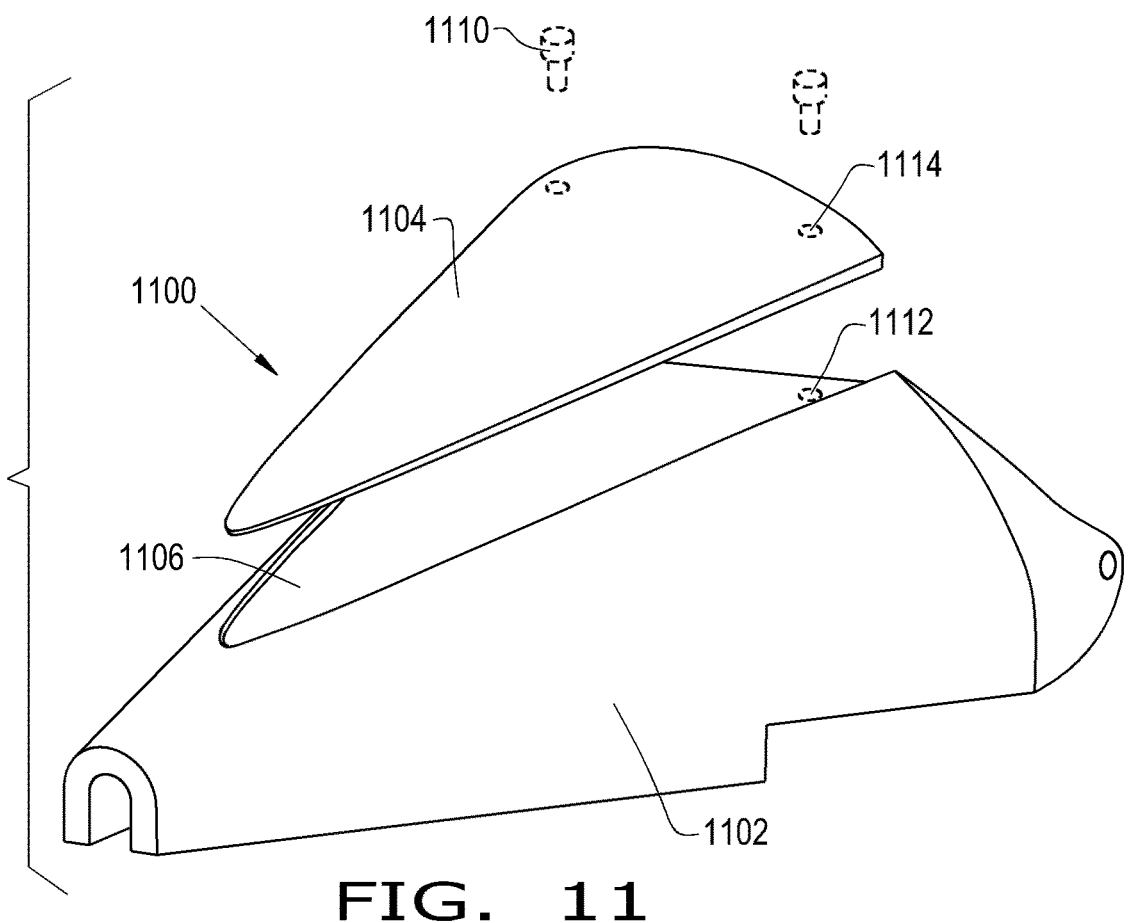
FIG. 11 illustrates an exploded perspective view of another exemplary embodiment of a divider, the divider comprising a base member and a removable ear dam member which is compression fit within the base member, in accordance with an exemplary embodiment of the present invention.
Figure 12:
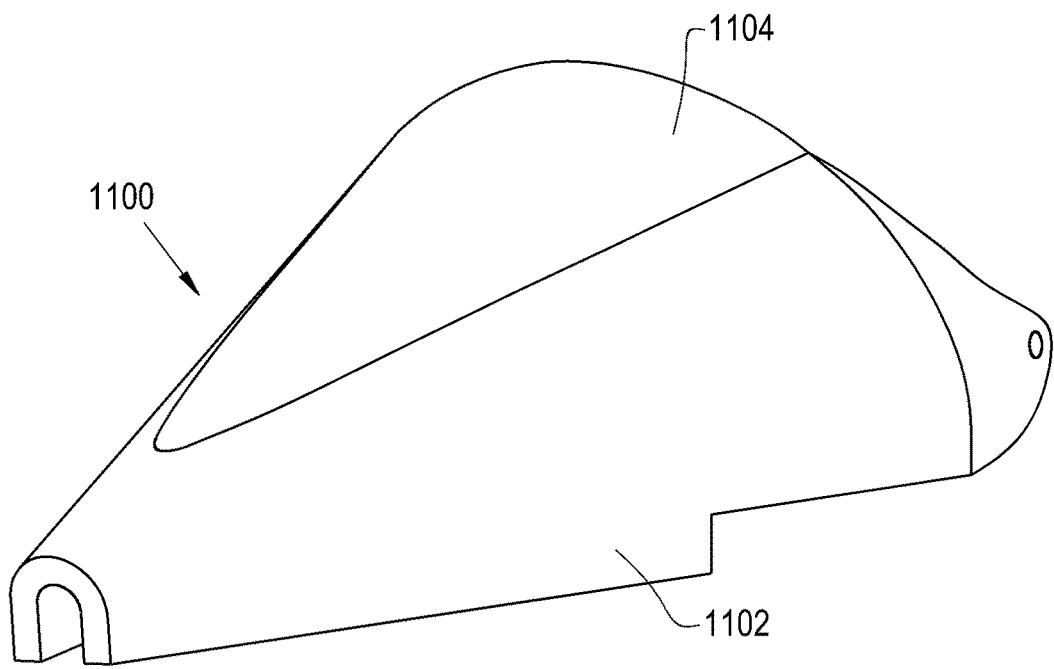
FIG. 12 illustrates a perspective of the divider of FIG. 11.
Figure 13:
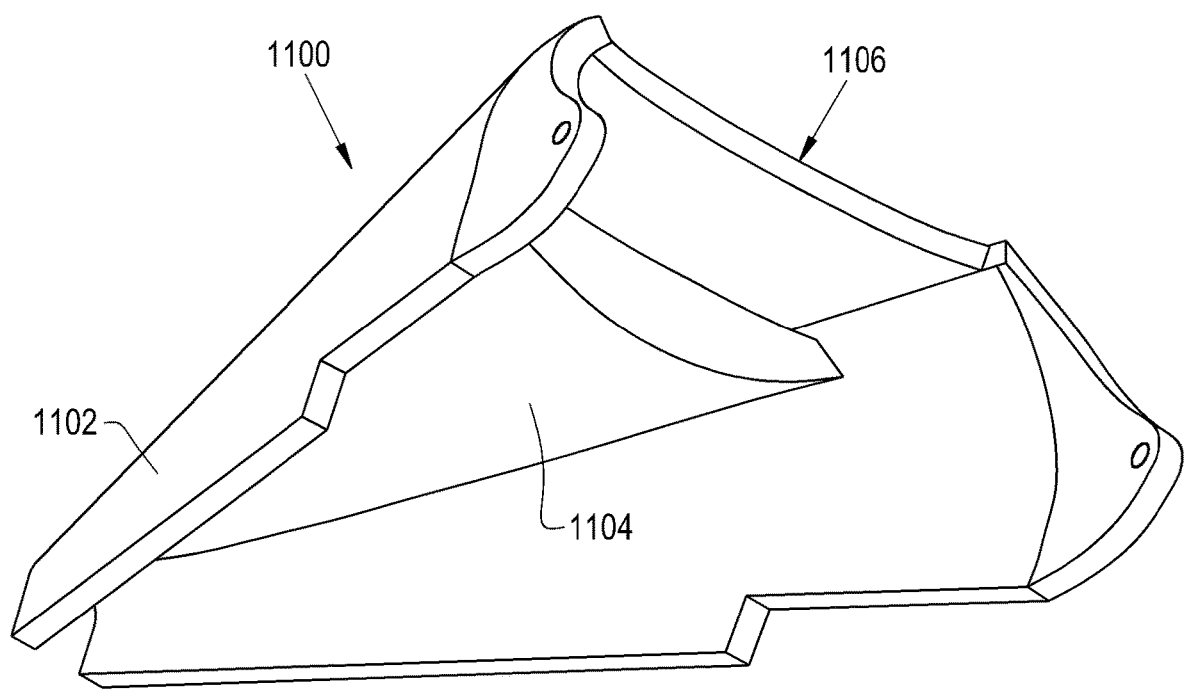
FIG. 13 illustrates a rear perspective view of the divider of FIGS. 11-12 with the ear dam member in a stored position.

Referring now to FIGS. 11-13, there is shown another exemplary embodiment of a divider 1100 which generally includes at least two members such as a base member 1102 and a removable ear dam member 1104. The divider 1100 may be similar to either divider 214, 800, as discussed above, except that the ear dam member 1104 is compression or snap-fit within the base member 1102. The ear dam member 1104 may be positioned on top of the base member 1104 in a work position (FIG. 12) and positioned within the base member 1104 in the stored position (FIG. 13). It should be appreciated the ear dam member 1104 may be stored internally within the base member 1102 or the internal space 212S of the hood 212.

The base member 1102 may be similar to the base member 216 of the divider 214, as discussed above, except that the base member 1102 includes a receiving section 1106 in the form of a recess 1106, which does not include a track (FIG. 13). The shape of the receiving section 1106 may substantially match the shape of the ear dam member 1104. It should be appreciated that the recess 1106 may include at least one opening to receive at least one protrusion or tab of the ear dam member 1104 so that the base and ear dam members 1102, 1104 interlock with one another. The base member 1102 may also include a receiving section within the shell of the base member 1102 to receive the ear dam portion in the second position.

The ear dam member 1104 may be similar to the ear dam member 218 of the divider 214, as discussed above, except that the ear dam member 1104 is snap-fitted into the receiving section 1106 and thereby does not include a protrusion 312 as in the ear dam member 218 of the divider 214. Thus, an operator may simply press the ear dam member 1104 into the base member 1102 or lift the ear dam member 1104 upwardly to remove the ear dam member 1104 from the base member 1102.

In alternative exemplary embodiment, the divider 1100 may further include fasteners 1110, shown in phantom in FIG. 11, to connect the ear dam member 1104 to the base member 1102. The base member 1102 and ear dam member may include corresponding through-holes 1112, 1114 to receive the fasteners 1110. Additionally, the fasteners 1110 may connect the ear dam member 1104 to the inside of the base member 1102 in the second position. It should be appreciated that either divider 214, 800 may also include fasteners to connect the ear dam member 218, 804 to the base member 216, 802.

In an alternative exemplary embodiment, the divider may include a base member and an ear dam member which is movably connected to the base member (not shown). In other words, the ear dam member may be permanently attached to the base member instead of removably attached to the base member. For example, the ear dam member may be pivotally connected to the base member at a pivot point adjacent to the back end of the base member. The ear dam member may then rotate between a work position in which the ear dam member rests on top of the base member and a stored position in which the ear dam member rotates underneath the base member, e.g. within the shell of the base member. Furthermore, the ear dam member may be slideably connected to base member via a sliding drawer configured with one or more tracks and/or rollers.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A crop dividing device for an agricultural header with a frame, comprising:
   a hood configured for connecting to the frame of the agricultural header; and
   a divider connected to the hood and comprising:
      a base member pivotally connected to the hood and comprising a receiving section; and
      an ear dam member receivable in the receiving section, the ear dam member is positionable in between a first position for increasing an overall slope of the divider and a second position for decreasing the overall slope of the divider, the ear dam member is connected to the receiving section in the first position, and the ear dam member is connected to one of the hood and base member in the second position,
   wherein the ear dam member comprises a first side defining a first ear dam slope and a second side opposite the first side and defining a second ear dam slope which is less steep than the first ear dam slope, and
   wherein the ear dam member is connected to the receiving section in the first position and the second position such that the first side faces upwardly and extends above the base member in the first position and the second side faces upwardly in the second position.

2. The crop dividing device of claim 1, wherein the first ear dam slope increases the overall slope of the divider.

3. The crop dividing device of claim 2, wherein the second position is a stored position of the ear dam member, and the ear dam member in the stored position is stored in one of the hood and base member such that the ear dam member does not extend above the base member, which decreases the overall slope of the divider for gathering a down crop material.

4. The crop dividing device of claim 1, wherein the receiving section of the base member is one of an indent and an opening, and the ear dam member is detachably connected to the receiving section in the first position.

5. The crop dividing device of claim 1, wherein the ear dam member comprises at least one protrusion configured for engaging with the receiving section of the base member.

6. The crop dividing device of claim 5, wherein the base member further comprises at least one track, and the at least one protrusion of the ear dam member engages with the at least one track in the first position.

7. The crop dividing device of claim 6, wherein the base member further comprises a shell body, an upper track adjacent to the receiving section, and a lower track inside the shell body, and the at least one protrusion of the ear dam member engages with the upper track in the first position and with the lower track in the second position such that the ear dam member does not contact a crop material and is stored within the base member in the second position.

8. The crop dividing device of claim 6, wherein the receiving section comprises at least one locking feature, and the ear dam member further comprises at least one corresponding locking feature which contacts the at least one locking feature of the receiving section in the first position.

9. The crop dividing device of claim 1, wherein the ear dam member contacts a crop material in both of the first position and second position.

10. A header connectable to an agricultural vehicle, comprising:
    a frame; and
    at least one crop dividing device connected to the frame, the at least one crop dividing device comprising:
       a hood connected to the frame; and
       a divider connected to the hood and comprising:
          a base member pivotally connected to the hood and comprising a receiving section; and
          an ear dam member receivable in the receiving section, the ear dam member is positionable in between a first position for increasing an overall slope of the divider and a second position for decreasing the overall slope of the divider, the ear dam member is connected to the receiving section in the first position, and the ear dam member is connected to one of the hood and base member in the second position,
       wherein the ear dam member comprises a first side defining a first ear dam slope and a second side opposite the first side and defining a second ear dam slope which is less steep than the first ear dam slope, and
       wherein the ear dam member is connected to the receiving section in the first position and the second position such that the first side faces upwardly and extends above the base member in the first position and the second side faces upwardly in the second position.

11. The header of claim 10, wherein first ear dam slope increases the overall slope of the divider.

12. The header of claim 11, wherein the second position is a stored position of the ear dam member, and the ear dam member in the stored position is stored in one of the hood and base member such that the ear dam member does not extend above the base member, which decreases the overall slope of the divider for gathering a down crop material.

13. The header of claim 10, wherein the receiving section of the base member is one of an indent and an opening, and the ear dam member is detachably connected to the receiving section in the first position.

14. The header of claim 10, wherein the ear dam member comprises at least one protrusion configured for engaging with the receiving section of the base member.

15. The header of claim 14, wherein the base member further comprises at least one track, and the at least one protrusion of the ear dam member engages with the at least one track in the first position.

16. The header of claim 15, wherein the base member further comprises a shell body, an upper track adjacent to the receiving section, and a lower track inside the shell body, and the at least one protrusion of the ear dam member engages with the upper track in the first position and with the lower track in the second position such that the ear dam member does not contact a crop material and is stored within the base member in the second position.

17. The header of claim 15, wherein the receiving section comprises at least one locking feature, and the ear dam member further comprises at least one corresponding locking feature which contacts the at least one locking feature of the receiving section in the first position.

18. The header of claim 10, wherein the ear dam member contacts a crop material in both of the first position and second position.

19. A method for selectively varying a crop saving capability of a header, comprising:

positioning an ear dam member in a first position in a crop dividing device for the header, the crop dividing device comprising a hood configured for connecting to the header and a divider connected to the hood, the divider comprising a base member pivotally connected to the hood and comprising a receiving section, the ear dam member comprising a first side defining a first ear dam slope and a second side, the positioning for increasing an overall slope of the divider by connecting the ear dam member to the receiving section such that the first side of the ear dam member faces upwardly and extends above the base member to increase an overall slope of the divider; and positioning the ear dam member in a second position for decreasing the overall slope of the divider by connecting the ear dam member to one of the hood and base member, the second side of the ear dame facing upwardly when the ear dam member is in the second position.

20. The method of claim 19, wherein the second position is a stored position of the ear dam member, and the ear dam member in the stored position is stored in one of the hood and base member such that the ear dam member does not extend above the base member, which decreases the overall slope of the divider for gathering a down crop material.

\* \* \* \* \*